United States Patent [19]
Fasen et al.

[11] Patent Number: 6,122,124
[45] Date of Patent: Sep. 19, 2000

[54] SERVO SYSTEM AND METHOD WITH DIGITALLY CONTROLLED OSCILLATOR

[75] Inventors: Donald J. Fasen; Charles E. Hessing, both of Boise, Id.; Benjamin A. Willcocks, Bristol, United Kingdom

[73] Assignee: Hewlett-Packard Co., Palo Alto, Calif.

[21] Appl. No.: 09/175,907

[22] Filed: Oct. 20, 1998

[51] Int. Cl.$^7$ ............................................. G11B 5/09
[52] U.S. Cl. ............................................. 360/51
[58] Field of Search ............................ 360/51, 73.01, 360/73.04

[56] References Cited

U.S. PATENT DOCUMENTS

| | | | |
|---|---|---|---|
| 4,242,619 | 12/1980 | Nakamura et al. | 318/314 |
| 4,243,921 | 1/1981 | Tamura et al. | 318/314 |
| 4,668,900 | 5/1987 | Tabuchi | 318/608 |
| 4,941,156 | 7/1990 | Stern et al. | 375/118 |
| 5,065,081 | 11/1991 | Shah | 318/638 |
| 5,526,200 | 6/1996 | Yada | 360/51 |
| 5,828,510 | 10/1998 | Yada et al. | 360/51 |
| 5,999,353 | 12/1999 | Hase et al. | 360/51 |

FOREIGN PATENT DOCUMENTS

0690442A2  1/1996  European Pat. Off. .

*Primary Examiner*—W. Chris Kim

[57] ABSTRACT

An adaptive media speed drive unit for use with a magnetic storage medium, the magnetic storage medium having a timing based servo pattern written thereon, the servo pattern including transitions, the drive unit including a magnetic head including a servo read element configured to read the servo pattern and produce a signal, the signal including recognizable signal events corresponding to the servo read element reading servo transitions; a servo decoder including time capture logic configured to determine the amount of time between the signal events; and a digitally controlled oscillator configured to produce a tracking clock which a write element can use to write data to the magnetic medium with a uniform spacing regardless of magnetic medium speed. A method for producing a tracking clock signal used for writing data in an equally spaced manner to a magnetic medium unit, the magnetic storage medium having a servo pattern written thereon, the servo pattern including transitions, the magnetic medium being movable relative to a magnetic head and the head including a servo read element configured to read the servo pattern and produce a signal, the signal including recognizable signal events corresponding to the servo read element reading servo transitions, the method comprising receiving the servo signal, and determining the speed of the magnetic medium, with respect to the head, by determining the amount of time between the signal events; and producing the tracking clock.

20 Claims, 9 Drawing Sheets

SERVO SYSTEM AND METHOD WITH DIGITALLY CONTROLLED OSCILLATOR

FIELD OF THE INVENTION

The invention relates to servo systems. The invention also relates adaptive magnetic media systems.

BACKGROUND OF THE INVENTION

One method for storing information on magnetic tape uses what is a known as "helical scan" technology. Helical scan tape systems cause information to be recorded in stripes that are diagonal relative to the length of a tape. The helical scan systems use a rotating drum head operating on a slowly driven tape, for high capacity. The tape is wrapped around the rotating drum.

Another method for storing information on magnetic tape uses what is known as "linear recording" technology. Linear recording tape systems cause information to be recorded in multiple parallel tracks that extend in the direction of the length of the tape. Linear recording systems use a stationary head operating on tape that is driven past the head at a speed that is typically much faster than the speed used by helical scan tape systems. With linear recording systems, multiple read/write elements can be employed in a head and can simultaneously operate on the tape. This invention relates to linear recording drive systems.

Servo systems employ information or patterns recorded along a track of the tape to accurately position read/write elements relative to data on the tape. The servo information can be used to accurately position heads relative to the length of the tape (e.g., when searching for a desired position along the length of the tape, such as the start of a file) as well as relative to the width of the tape. Thus, servo patterns on a tape have a characteristic that changes across the width of the tape.

Various servo systems are known in the art. For example, U.S. Pat. No. 5,432,652 (incorporated herein by reference) relates to a magnetic tape that has three evenly spaced-apart longitudinally-extending servo track areas. Four equal-sized longitudinally-extending data track areas are disposed between the servo track areas and between longitudinal edges of the tape and one of said longitudinally-extending data track areas. For track following, all servo track areas are simultaneously sensed for producing one head positioning signal.

U.S. Pat. No. 5,008,765 (incorporated herein by reference) relates to a method for reading or writing data on a tape which has a plurality of data tracks and at least a first dedicated servo track. A multiple channel head is used to access the tracks on the tape. The head is moved proximate one of a plurality of predetermined positions. The channels are located so that, in any one predetermined position of the head, one channel accesses the center of a dedicated servo track on the tape and at least two other channels will access the center of distinct data tracks.

U.S. Pat. No. 5,262,908 (incorporated herein by reference) relates to a tracking control device for a magnetic recording/reproducing apparatus arranged in such a manner that a head unit having a plurality of magnetic heads is successively moved in the widthwise direction of a magnetic tape for switching tracking positions so that data recording/reproducing is, by each of the plurality of magnetic heads, performed along a plurality of data tracks formed on the magnetic tape in parallel to a direction in which the magnetic tape moves.

U.S. Pat. No. 5,574,602 (incorporated herein by reference) relates to a magnetic tape drive. A magnetic head simultaneously senses plural track lateral position indicators to generate a like plurality of independently generated sensed position error signals. The sensed position error signals are combined to provide an output position error signal that drives a positioning system to position the magnetic head laterally of the length of the magnetic tape. The output position error signal represents an average of the position errors indicated by the sensed position error signals. The quality of the sensed position error signal is monitored, eliminating poor quality signals from the output position error signal for maintaining a quality servo control.

U.S. Pat. No. 5,450,257 (incorporated herein by reference) relates to a head-track orienting system for use in magnetic recording tape drives which automatically corrects for misalignment between the head assembly and a recorded servo track on the tape. Using a servo control loop, the system calculates head-track alignment error during operation of the tape drive and either pivots the head assembly or adjusts the tape cartridge to compensate for the error. Transverse head-track positioning mechanisms are also included in the system to locate and maintain a centered position of the heads on the servo track.

One type of servo system is a timing based system. Timing based servo systems are known in the art. In such servo systems, servo bands are written which have a particular servo band configuration. This servo band configuration provides both an indication of position (and speed) in the direction of travel of the tape, and an indication of lateral position of the tape relative to the servo element reading the servo band. The tape drives include a timing based demodulation scheme for sensing the servo information on the tape. This information includes lateral position, tape speed, and encoded data bits. The position of the head relative to the tape width is derived from the relative timing of opposite azimuthally sloped transitions. Readback pulses from the servo code are processed in bursts. A burst is a set of transitions grouped together to generate a predetermined number of pulses when read. The time difference between adjacent bursts represents lateral position and the time difference between alternate bursts represents tape speed. See European Patent Application EP 0690442 A2 for detailed information regarding time based servo systems.

In Adaptive Tape Speed (ATS) systems, tape speed is adapted to the host data rate. This allows fast hosts to transfer data at a high rate while slow hosts will not be forcing the tape drive to stop the tape and reposition back as the data to be written to the tape runs out of the data buffer.

To accomplish ATS, a clock which tracks the tape speed is needed for generating the write clock and to allow the bandwidth of the analog readback filters to track the tape speed. The write clock needs to be a low jitter clock that smoothly tracks the tape speed to ensure that the data bits written to the tape are placed at a uniform spatial distance for any allowed tape speed.

Tape drives include analog readback filters. Readback filters remove noise and are typically Bessel filters or linear phase filters. These filters often use a phase locked loop locked to a clock to set the filter bandwidth. The bandwidth of the readback filter of an ATS tape drive needs to scale with tape speed to create a constant spatial bandwidth because the readback signal bandwidth scales with tape speed and is actually a constant spatial spectrum.

Such a tracking clock could be generated with a Phase Locked Loop (PLL) locked to the servo code written on the tape. The current speed range required by the ATS system is within the range of conventional analog voltage controlled oscillators used in phase locked loops. Using such a phase locked loop would allow filtering or averaging of the speed information from the servo code to offer some immunity to defects and dropouts in the servo signal.

Phase locked loops and frequency locked loops are known in the art and are similar to one another, except that a phase locked loop tracks phase as well as frequency. A phase locked loop includes a phase detector having a first input receiving the incoming message, having a second input, and having an output; a loop filter having an input coupled to the output of the phase detector and having an output; a voltage controlled oscillator (VCO) having an input coupled to the output of the loop filter, and having an output defining an output of the phase locked loop; and a divider having an input coupled to the output of the voltage controlled oscillator and having an output connected to the second input of the phase detector. The phase detector produces an output voltage proportional to the phase difference of two input signals. The loop filter is used to control the dynamics of the phase locked loop. The voltage controlled oscillator produces an AC output having a frequency proportional to input control voltage. The divider produces an output signal having a frequency that is an integer division of the input signal. The loop filter includes a capacitor on a control node of the voltage controlled oscillator.

The term "phase locked loop" as used herein are meant to describe physical structure, not a state of operation. The term "locked" in the phrase "phase locked loop" does not imply that the circuitry is operating, or functioning in a locked condition. Thus, as used herein, "locked" is a term for assisting definition of a particular circuit configuration and is not meant to imply a required state of operation for the circuit.

A disadvantage of this phase locked loop approach is in the fact that the frequency generated by the analog voltage controlled oscillator as a function of the control voltage is unpredictable over temperature, power supply voltage and part to part variations. Due to this unpredictability, a loop is locked using a phase/frequency comparator to adjust the voltage controlled oscillator control voltage until the voltage controlled oscillator phase and frequency matches the desired phase and frequency.

This feedback requirement makes holding the frequency of the voltage controlled oscillator constant over long servo dropouts difficult. If the phase/frequency comparator simply stops receiving pulses from the tape servo code, the voltage controlled oscillator will drift in frequency from the last good data. Methods to switch the phase locked loop into a hold mode are also prone to offsets and drift in the held frequency. Also, if an ATS range greater than the current range was required, the analog voltage controlled oscillator in the phase locked loop would need to have multiple ranges. This would require spaces left on the tape to allow the phase locked loop to settle into the new range.

SUMMARY OF THE INVENTION

The invention provides a multiple phase clock generator in a tracking clock used to write data to the magnetic medium such that data bits written on the magnetic medium are evenly spaced on the magnetic medium regardless of speed. To avoid the analog circuit problems discussed above in the Background of the Invention, a digitally controlled oscillator (DCO) is employed to define a tracking clock. By using multiple clocks of the same frequency with a phase shift between each of the phases in the DCO, a high resolution tracking clock is generated with much lower DCO clock speeds.

One aspect of the invention provides an adaptive media speed drive unit for use with a magnetic storage medium, the magnetic storage medium having a timing based servo pattern written thereon in a servo band, the servo pattern including transitions, the drive unit including a magnetic head including a servo read element configured to read the servo pattern and produce a signal, the signal including recognizable signal events corresponding to the servo read element reading servo transitions, the magnetic head further including a data write element; a servo decoder including time capture logic configured to determine the amount of time between the signal events; and a digitally controlled oscillator configured to produce a tracking clock which the write element can use to write data to the magnetic medium with a uniform spacing regardless of magnetic medium speed, the digitally controlled oscillator including a multiple phase clock generator whereby resolution is enhanced.

Another aspect of the invention provides an adaptive speed tape drive for use with a magnetic tape having a length and a width and a servo pattern written thereon, the servo pattern including transitions, the tape drive comprising a tape head including a data write element and a servo read element configured to read the servo pattern and produce a signal, the signal including recognizable signal events corresponding to the servo read element reading servo transitions; a motor configured to move the length of the tape relative to the head so that the servo read element can read the servo pattern; a servo decoder configured to receive the servo signal, the servo decoder including time capture logic configured to determine the amount of time between the signal events; and a digitally controlled oscillator configured to produce a tracking clock which the write element can use to write data to the tape with a uniform spacing regardless of tape speed, the digitally controlled oscillator including a multiple phase clock generator.

Another aspect of the invention provides a method for producing a tracking clock signal used for writing data in an equally spaced manner to a magnetic medium in an adaptive speed drive unit, the magnetic storage medium having a servo pattern written thereon in a servo band, the servo pattern including transitions, the magnetic medium being movable relative to a magnetic head and the head including a servo read element configured to read the servo pattern and produce a signal, the signal including recognizable signal events corresponding to the servo read element reading servo transitions, the method comprising receiving the servo signal, and determining the speed of the magnetic medium, with respect to the head, by determining the amount of time between the signal events; and producing the tracking clock by loading a reload value representative of the speed of the magnetic medium in counters of a digitally controlled oscillator having a multiple phase clock generator.

Other features and advantages of the invention will become apparent to those of ordinary skill in the art upon review of the following detailed description, claims, and drawings.

DESCRIPTION OF THE DRAWINGS

FIG. 7 illustrates a DCO included in the drive unit of FIG. 1.

DETAILED DESCRIPTION OF THE INVENTION

Figure 1:
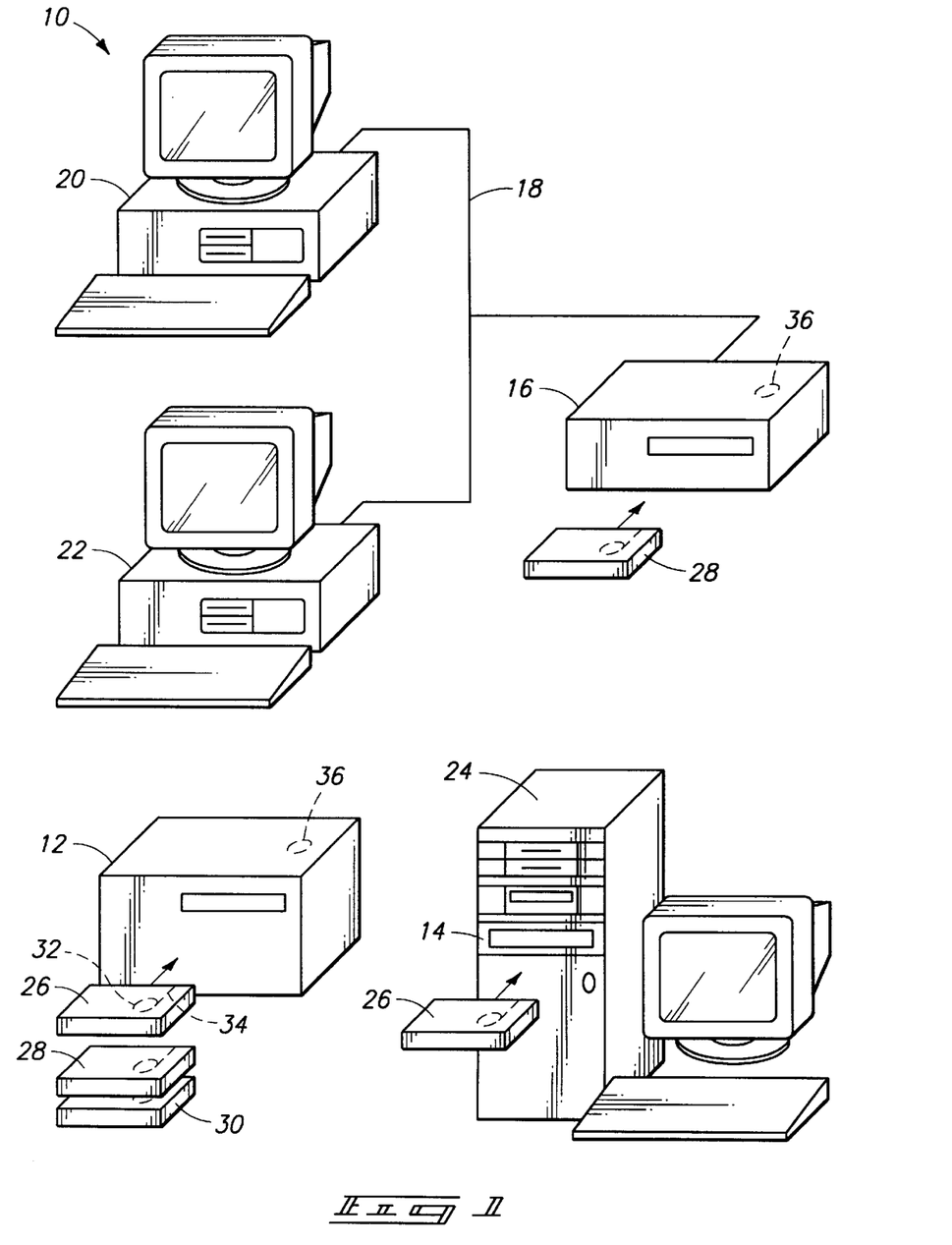
FIG. 1 is a perspective view of a drive unit including a servo reader in accordance with one embodiment of the invention.

FIG. 1 shows a system 10 including a servo writer 12, and a plurality of drive units, such as tape drives 14 and 16. Although the invention is illustrated as being employed in connection with computer tape data storage in FIG. 1, the invention has a wide variety of applications. For example, some aspects of the invention can be used in connection with storage media other than tapes, or for storing either analog or digital music or information other than data. Some aspects of the invention can be embodied, for example, in connection with any of a variety of types of storage devices, including disk storage devices. For purposes of illustration only, the invention will be described in connection with tape technology.

The drive units 14 and 16 respectively read data from and write data to tape or other form of magnetic storage media. The tape drives 14 and 16 can be coupled to networks or used with individual computers. For example, tape drive 16 is connected to a network 18 for communication with computers 20 or 22, and tape drive 14 is used with an individual computer 24. Further, the tape drive coupled to a network or used with an individual computer can be either a stand alone unit (separate from a computer) or can be configured to be received in a bay in a computer. For example, in the illustrated embodiment, tape drive 16 is a stand alone tape drive, and tape drive 14 is supported in a bay inside a housing of computer 24. In the illustrated embodiment, the drive units 14 and 16 are linear recording drive systems. Alternative embodiments are possible.

In the illustrated embodiment, the servo writer 12 and the tape drives 14 and 16 are used with tape cartridges 26, 28, or 30. In the illustrated embodiment, the tape cartridges are single reel type tape cartridges, and respectively include a housing supporting a reel 32, and tape 34 wound on the reel. A second reel 36 included in the servo unit 12 or in the tape drive 14 or 16 engages the tape. In an alternative embodiment, the tape cartridge includes two reels. The tape has a width W (FIG. 2) such as 8 mm, 4 mm, ¼ inch, or ½ inch. The tape also has a length in the direction of tape travel (i.e., in the direction perpendicular to the direction of the width W). The direction of tape travel is illustrated by an arrow 37.

The servo writer 12 pre-writes servo code to the tapes for subsequent use in a tape drive 14 or 16 which reads and writes data and reads servo code. The servo writer 12 produces timing based servo patterns, as opposed to amplitude based servo patterns.

Figure 2:
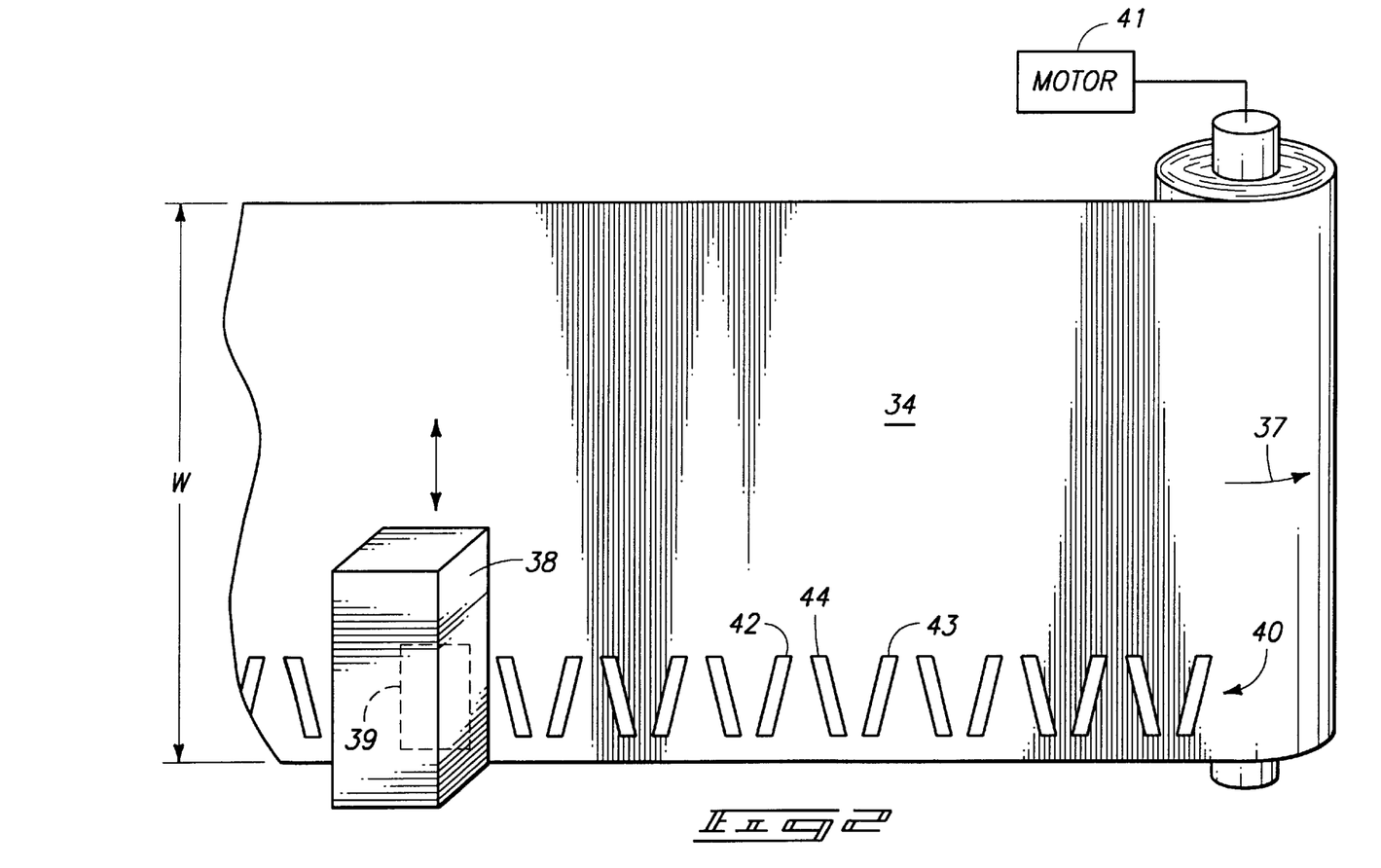
FIG. 2 illustrates a servo pattern in a servo band read by the servo reader of FIG. 1.

FIG. 2 illustrates a servo band configuration that could be employed in one embodiment of the invention for a servo band. This servo band configuration shown in FIG. 2 provides both an indication of position (and speed) in the direction of travel of the tape, and an indication of lateral position of the tape relative to the servo element reading the servo band. The tape drives 14 and 16 include a timing based demodulation scheme for sensing the servo information on the tape 34. The tapes drives 14 and 16 have respective heads 38. The position of a head 38 relative to the tape width W is derived from the relative timing of azimuthally sloped transitions. More particularly, the heads 38 respectively include servo read elements 39, data write elements 170, and data read elements 172. The tape 34 has written thereon servo code in a servo band 40. The servo code includes two opposite azimuth bursts with a count of ten transitions and two opposite azimuth bursts with a count of eight transitions. As show in FIG. 2, there are transitions, such as transitions 42 and 43 with a positive slope, and transitions such as transition 44 with a negative slope. Regardless of the lateral position of the head 38, the timing between transitions 42 and 43 is the same because transitions 42 and 43 have the same slope. Therefore, speed information is easily determined. In order to determine lateral position of the head 38, in order to determine whether the head is closer to one side or the other of the servo band, a pattern of two bursts of ten transitions followed by two bursts of eight transitions is used. In the illustrated embodiment, by way of example, the transitions 42 and 43 are written at six degrees azimuth angle. Thus, readback pulses from the servo code are processed in bursts. A burst is a set of transitions grouped together to generate a predetermined number of pulses when read. The time difference between adjacent bursts represents lateral position and the time difference between alternate bursts represents tape speed. See European Patent Application EP 0690442 A2 for detailed information regarding time based servo systems.

Because this is a time based servo system, a high resolution timing measurement is necessary to achieve a high resolution position measurement.

The tape 34 is movable relative to the head 38. More particularly, the tape drives 14 and 16 respectively include a motor 41 configured to move the length of the tape relative to the head and the servo read element 39 of the head 38 reads the servo pattern. The servo read element 39 produces a signal including recognizable signal events corresponding to the servo read element reading servo transitions. More particularly, a peak occurs in the servo readback waveform when the servo read element 39 reads a servo transition 42, 43, or 44.

The tape drives 14 and 16 respectively include a servo decoder 48 (FIG. 3) configured to receive the servo signal from the servo read element 39. In the illustrated embodiment, the servo decoder 48 is defined in an application specific integrated circuit (ASIC) 49 which includes a preamplifier 50 coupled to the servo read element 39, an analog filter 174 coupled to the preamplifier 50, a pulse detector 54 coupled to the analog filter 174, and time capture logic 56 coupled to the pulse detector 54.

Figure 3:
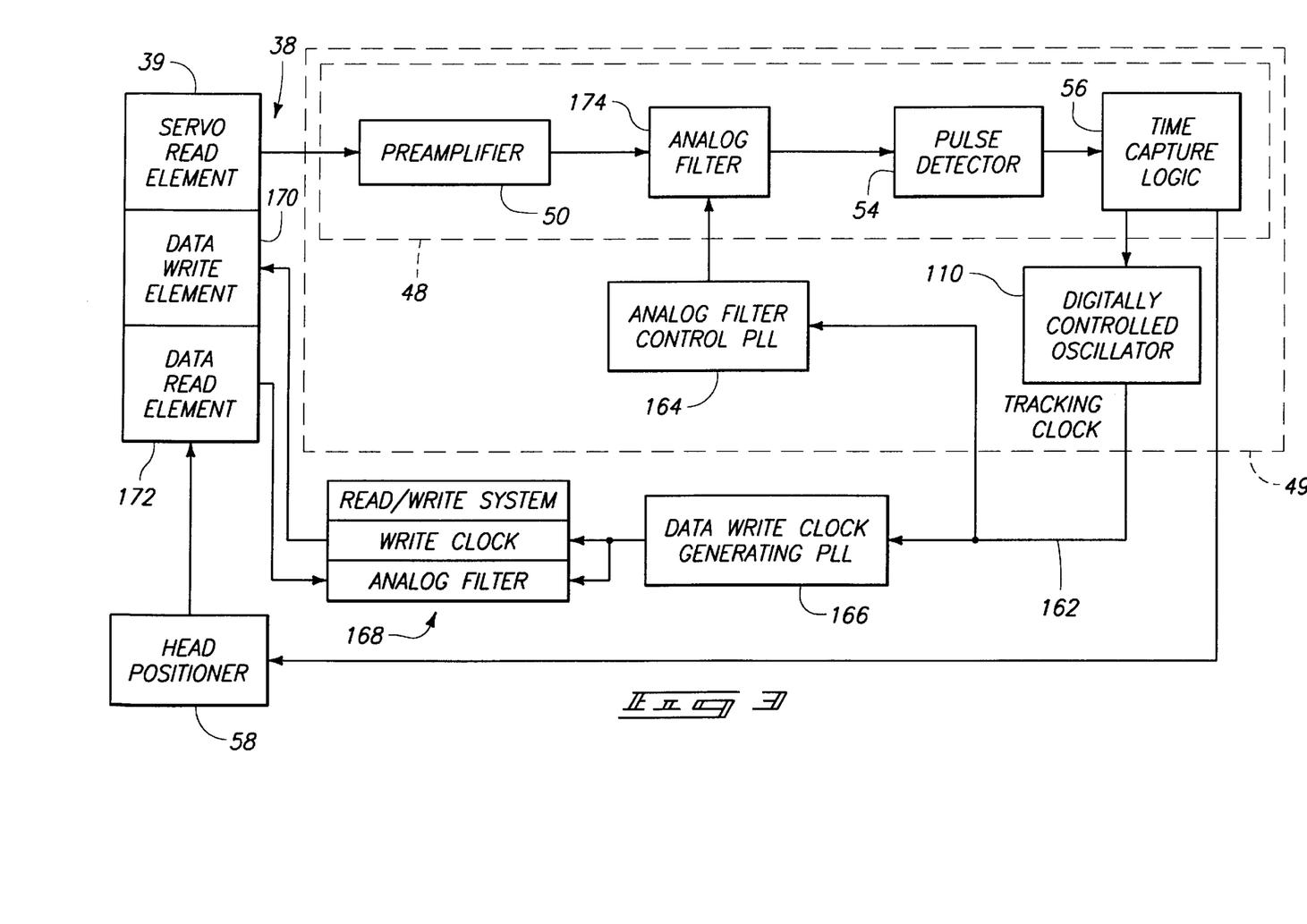
FIG. 3 is a block diagram illustrating circuitry included in the drive unit of FIG. 1.

The servo decoder 48 determines the position of the head 38, with respect to the servo band 40, in response to the amount of time between the signal events, and generates an error signal indicative of actual head position relative to desired head position in the servo band 40. For example, in a linear drive system, the error signal indicates actual head position relative to desired head position with respect to the width W of the tape 34.

The tape drives 14 and 16 respectively further include a head positioner 58 configured to adjust the position the head relative to the magnetic storage medium, with respect to the servo band 40, in response to the error signal.

Figure 4:
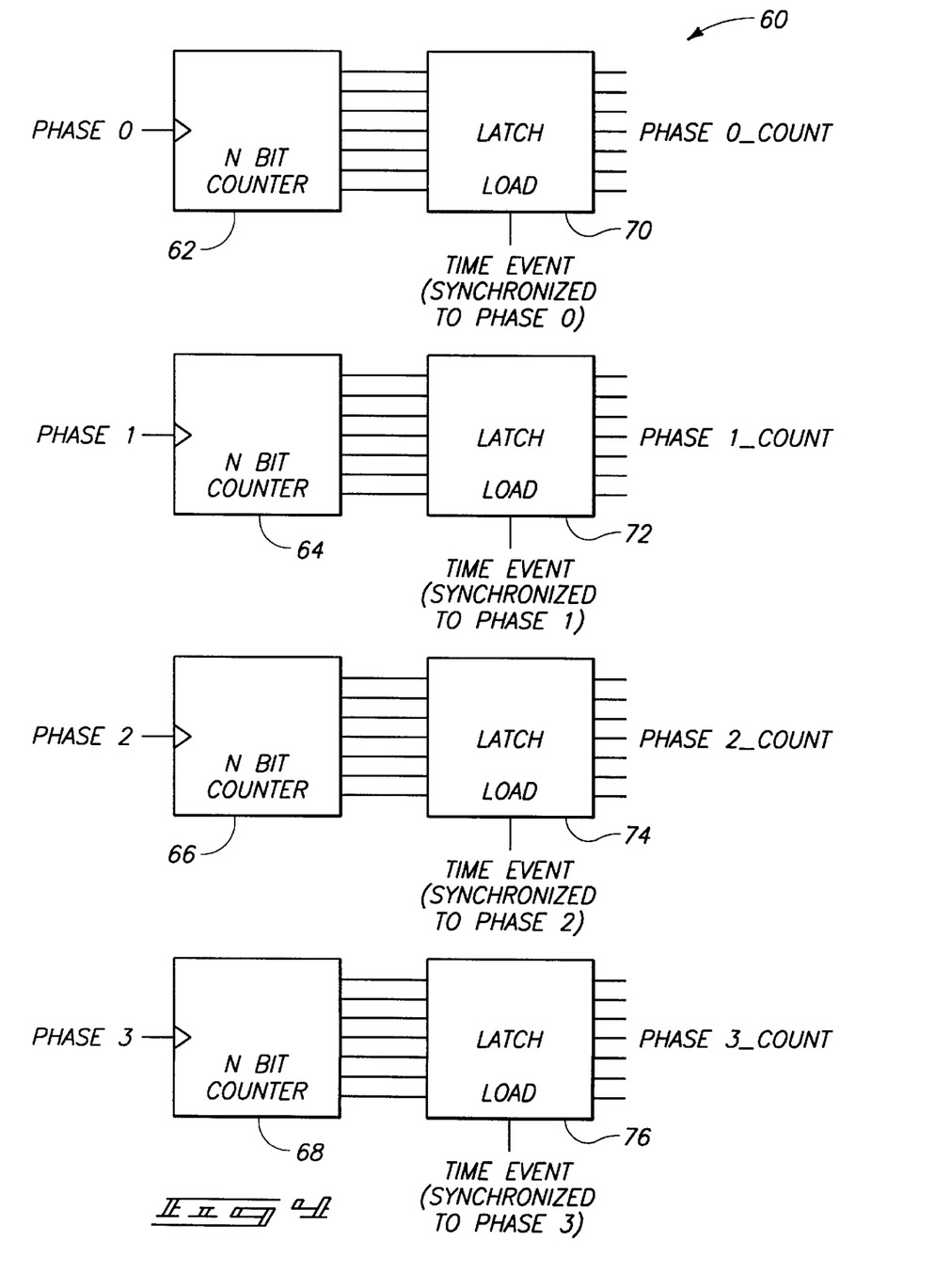
FIG. 4 illustrates time capture circuitry included in the drive unit of FIG. 1.

The time capture logic 56 of the servo decoder 48 is configured to determine the amount of time between the signal events, as indicated by the pulse detector 54. The time capture logic includes time capture circuitry 60 (FIG. 4).

In one embodiment, the time capture circuitry 60 comprises a plurality of counters 62, 64, 66, and 68. The counters 62, 64, 66, and 68 are multiple-bit binary counters configured to count freely. The time capture circuitry 60 further includes a plurality of multiple-bit latches 70, 72, 74, and 76 respectively coupled to the binary counters. The latches latch count values for the respective phases in response to the recognizable signal events corresponding to the servo read element reading servo transitions. The latches include load inputs which are triggered by the leading edge of a pulse indicating a time event is starting or stopping. To minimize asynchronous circuitry, multiple instances of the time events are created, corresponding to the number of phases, and each latch 70, 72, 74, and 76 is synchronized to one of the instances. After the latch data has settled, the sum of the values in the latches 70, 72, 74, and 76 is computed to create a high resolution time value. The calculation of the sum is performed in a post processor in the time capture logic 56 while the counters 62, 64, 66, and 68 continue to count. After the high resolution time stamps are calculated, further processing of the time difference between events is performed with conventional data path processing methods.

Figure 5:
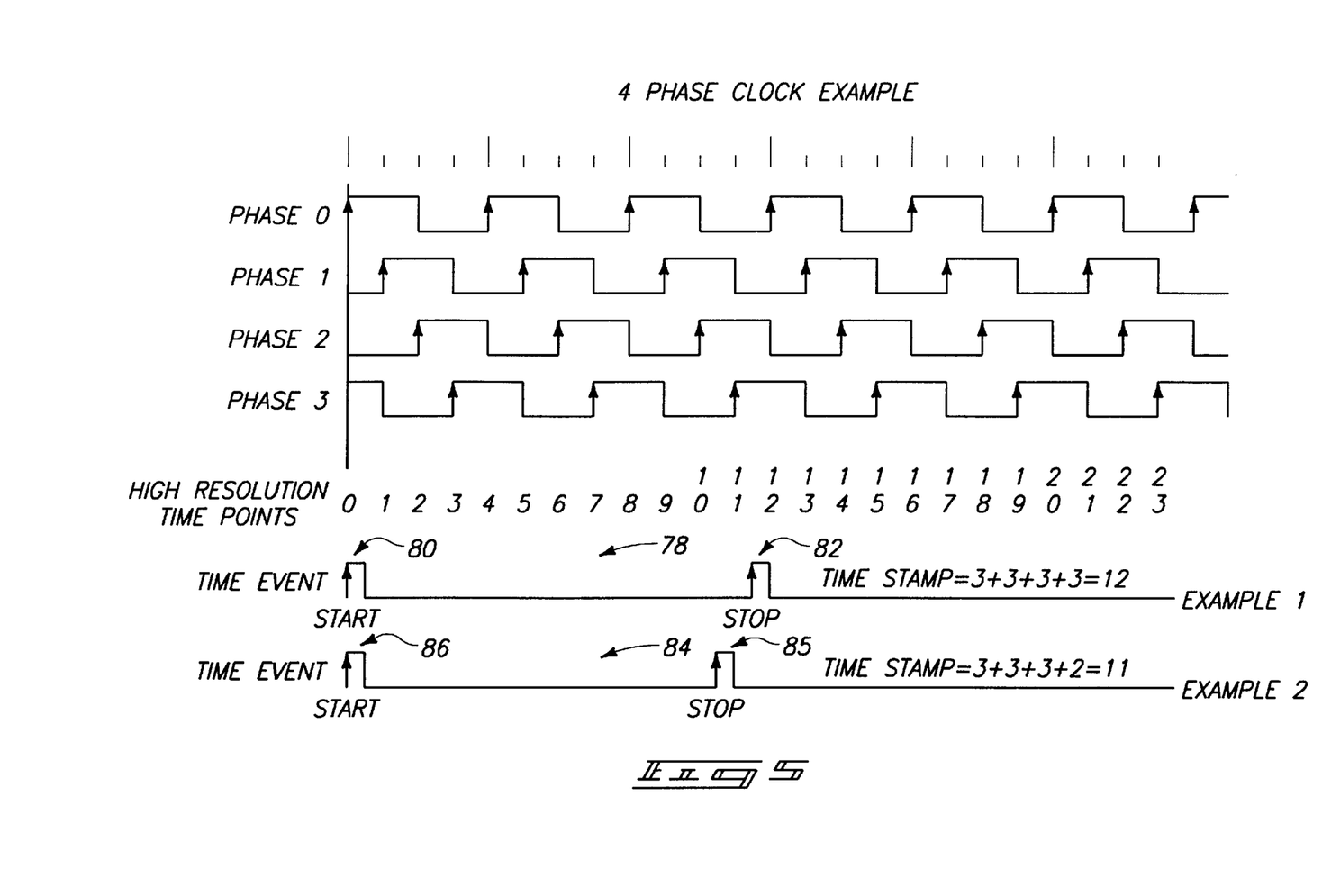
FIG. 5 is a graph illustrating operation of the time capture circuitry of FIG. 4.

FIG. 5 illustrates the increase in resolution that is gained by having multiple phases. For a first time event 78, the time stamp is equal to the sum of count values for counters 62, 64, 66, and 68 between leading edges of start and stop pulses 80 and 82. There are three leading edges for each phase 0 through phase 3 between the leading edges of pulses 80 and 82. Thus, the time stamp for the event 78 is 3+3+3+3=12.

For a second time event 84, the time stamp is equal to the sum of count values for counters 62, 64, 66, and 68 between leading edges of start and stop pulses 86 and 85. There are three leading edges for each phase 0 through phase 2 between the leading edges of pulses 86 and 85 and two leading edges for phase 3. Thus, the time stamp for the event 78 is 3+3+3+2=11. If a multiple phase clock were not used, it would not be possible to distinguish between time events 78 and 84 using a clock of the same speed.

In one embodiment, the counters are respectively configured to count at a frequency no greater than 400 MHZ. More particularly, the number of phases for the multiple phase clock are selected based on a desired resolution and based on the frequency of the input clock. For example, using a four phase clock at 50 MHZ allows time capture resolution of 5 ns (1÷50 MHZ÷4) or the equivalent of a 200 MHZ single phase clock. Thus, in one embodiment, the counters are respectively configured to count at a frequency no greater than 50 MHZ and the multiple phase clock includes at least four phases. As higher and higher speed clocks become possible and cost effective in ASICs, as technology progresses, the invention will still provide increased resolution for any given clock speed.

There are other methods of combining the data from the multiple phases which do not require the duplication of the counter for each of the clock phases. This is especially beneficial as the number of phases increases.

In one embodiment (FIG. 6), a multiple phase clock generator 87 comprises a plurality of delay elements 88, 90, and 92 coupled together in cascade, and an input clock 104 coupled to the first delay element 88. The delay elements 88, 90, and 92 each have an input and an output. The delay elements define respective phases Ph0, Ph1, Ph2, and Ph3 of the multiple phase clock generator 87. These phases Ph0, Ph1, Ph2, and Ph3 are coupled to the clock inputs PHASE 0, PHASE 1, PHASE 2, and PHASE 3, respectively, of counters 62, 64, 66, and 68 of FIG. 4. Thus, the number of delay elements 88, 90, and 92 depends on the number of phases. In the illustrated embodiment, three delay elements are provided defining four phases Ph0, Ph1, Ph2, and Ph3. However, they may be any desired number of phases. For example, in one embodiment, there are eight phases. The multiple phase clock generator 87 further includes an input clock 104 coupled to the input of the first delay element 88. The last delay element 92 has an output Ph3 that is controlled to have a phase that is the same as the phase of the input clock 104. More particularly, the delay elements 88, 90, and 92 are adjustable delay elements and the tape drives 14 and 16 further include control circuitry configured to adjust the delay elements such that the output Ph3 of the last delay element 92 has the same phase as the input clock 104. In the illustrated embodiment, the delay elements 88, 90, and 92 are all controlled simultaneously as opposed to being individually controllable. The delay elements 88, 90, and 92 are therefore preferably constructed in a localized and controlled manner, so that the delay variation between delay elements is limited. Otherwise, non-uniformity of the phases with respect to each other phase may lead to error in the captured time value of the event.

Figure 6:
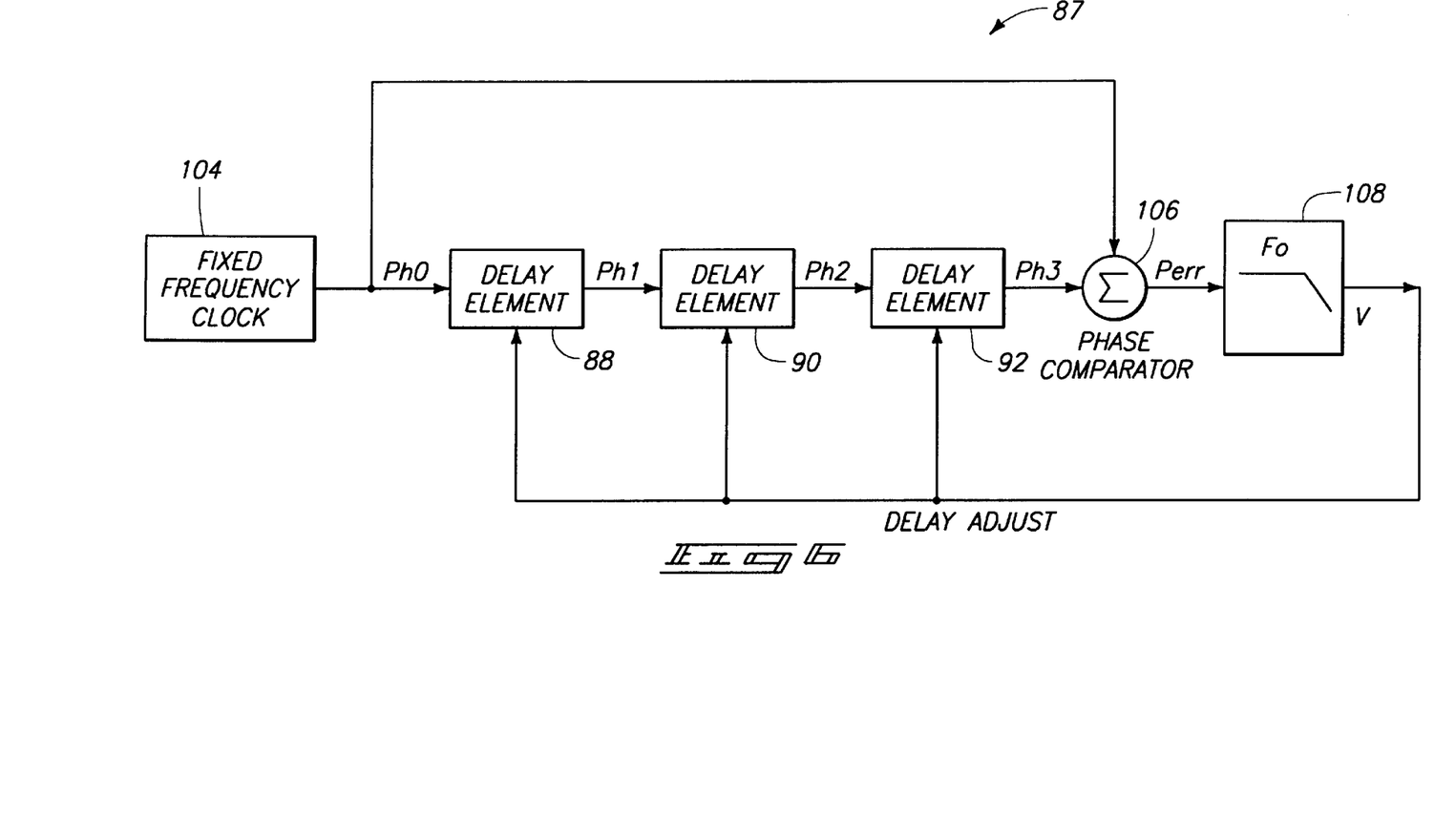
FIG. 6 illustrates a multiple phase clock generator used with the circuit of FIG. 4.

The control circuitry includes a phase comparator 106 which compares the phase of the output Ph3 of the last delay element 92 with the input clock 104 and provides an output Perr indicative of any difference in phase. The control circuitry further comprises a low pass filter 108. The phase error between the input clock 104 and the output Ph3 of the last delay element 92 is filtered and used to adjust the delay of all of the delay elements 88, 90, and 92. This way, the total delay of all of the delay elements is assured to be one cycle of the input clock over part to part, temperature, supply voltage and any other variations.

The number of phases of the multiple phase clock generator 87 is selected based on a desired resolution and based on the frequency of the input clock 104. For example, in one embodiment, the input clock 104 has a frequency no greater than 50 MHZ and wherein the multiple phase clock generator 87 has at least four phases. Using a four phase clock at 50 MHZ allows time capture resolution of 5 ns or the equivalent of a 200 MHZ single phase clock. In another embodiment, the input clock 104 has a frequency no greater than 50 MHZ and the multiple phase clock generator 87 has at least eight phases.

A multiple phase clock generator can also be employed in a tracking clock used to write data to the tape such that data bits written on the tape are evenly spaced on the tape regardless of tape speed. To avoid the analog circuit problems discussed above in the Background of the Invention, a digitally controlled oscillator (DCO) 110 is employed in the ASIC 49 (FIG. 3) to define a tracking clock 162. The tracking clock 162 is used in connection with writing data to the tape 34.

A digitally controlled oscillator generates a clock with a frequency determined by the numeric value in a control register. In a digitally controlled oscillator, the output frequency is known exactly for any control register value. Therefore, a feedback loop is not required. This simplifies design because loop stability and dynamics do not need to be considered. Holding the digitally controlled oscillator at the last known good frequency through a long servo signal dropout is a simple as not updating the control register value until good data is detected again.

The ASIC 49 further includes an analog filter control PLL 164. The tape drives 14 and 16 respectively include an analog filter 174 which is a readback filter which filters the readback signal from the servo read element 39. The bandwidth of the analog filter 174 tracks the speed of the tape 34. More particularly, the analog filter control PLL 164 causes the bandwidth of the analog filter 174 to track the input clock to the PLL 164. The input clock to the PLL 164 is the tracking clock 162.

The tape drives 14 and 16 further respectively include a data write clock generating PLL 166 having an input coupled to the tracking clock 162. The tape drives 14 and 16 further respectively include a read/write system 168 having a write clock coupled to the data write clock generating PLL 166 and to the data write element 170. The read/write system 168 further has an analog filter coupled to the data write clock generating PLL 166 and to the data read element 172. The data write clock generating PLL 166 multiplies the tracking clock 162 to a frequency appropriate for the write clock of the read/write system 168.

As long as the digitally controlled oscillator 110 can generate the maximum desired frequency with sufficient resolution for an incremental change in the control register value, generating much lower frequencies is straightforward matter of designing a sufficient number of bits in the counters used to construct the digitally controlled oscillator. In one embodiment, a reloadable counter fed by a high frequency clock would be used to implement this type of digitally controlled oscillator. The value in the control register would be used as the reload value for the down counter to determine the number of high frequency clock cycles between zero counts of the counter. The control register value would actually determine the period of the tracking clock.

The difficulty with this approach is in achieving the frequency resolution needed to keep the tracking clock frequency sufficiently close to the ideal value for any tape speed. For example, if the maximum tracking clock is 20 MHZ and the DCO clock is 100 MHZ, the period resolution is 10 nanoseconds with a tracking clock period of 50 ns or 20% steps in frequency. This is very coarse frequency resolution, yet requires a relatively high 100 MHZ DCO clock frequency.

FIG. 7 shows a DCO 110 which uses multiple clocks PHASE 0, PHASE 1, PHASE 2, and PHASE 3 of the same frequency with a uniform phase shift between each of the phases. By using multiple clocks of the same frequency with a uniform phase shift between each of the phases, a high resolution tracking clock 162 is generated with much lower DCO speeds. Each phase has a downward counter 112, 114, 116, and 118, respectively, which is automatically reloaded with the contents of a count field 120 when the count down reaches zero count. More particularly, comparators 122 separately reload the counters with the contents of the count field 120 when the counters reach zero. The DCO 110 includes a multiplexor 124 which selects which of the clock phase counters zero count is used to generate the tracking clock output 162 based on a value in a phase field 130. The count reload value and the phase to be selected as the output pulse is precalculated with an accumulator 126 when the previous output pulse occurred.

In order to generate even finer resolution when several output pulse periods are averaged, an UnderRange 128 is maintained in the accumulator calculations. The UnderRange value 128 is combined with the phase increment 130 and the count increment 120 to create a period register 132 as shown in FIG. 7. In the illustrated embodiment, the UnderRange value 128, the phase increment 130, and the count increment 120 are stored and processed in binary form.

The period register 132 is the control register input for specifying the desired period of the tracking clock. Although the period register 132 includes three fields in the illustrated embodiment, each with a different period resolution, the period register 132 is treated as linear control word having a LSB (least significant bit) resolution that is the input clock divided by the number of phases divided by the UnderRange count.

In the embodiment shown in FIG. 7, assume:
DCOclockFreq=25 MHz (period=40 ns) Fundamental DCO clock frequency;
NumberOfPhases=4 (2 Phase selection bits. 40/4=10 ns per phase); and
UnderRangeCount=4 (2 UnderRange bits. 10 ns/4=2.5 ns)
If the desired period is 183 ns (5.46 MHz) is desired, 183 ns/2.5 ns=73.2 or a Period register value of 73.

As a binary number, this Period Register value is:

0100|10|01

Cnt|PH|UR

This can be seen as the time interval between subsequent output pulses in the following breakdown:

CountField = 4 (4×40 ns Count reload value)

PhaseField = 2 (2×10 ns Phase Increment)

UnderRange = 1 (1×2.5 ns Accumulated each output pulse)

Sum = 182.5 ns = 73×2.5 ns

PeriodRegister=4,2,1 using "," as the field separator.

The DCO 110 is broken into two sections: the next accumulator calculation of an execution register 134 and the counters and phase selection multiplexor 124 which acts on the contents of the execution register 134.

The accumulator 126 simply adds the contents of the period register 132 to the current phase and UnderRange fields 130 and 128 in the accumulator 126 and stores the result back in the accumulator 126. The count and phase fields 120 and 130 of the accumulator 126 are stored in the execution register 134 after the count value is decremented by one because the counter counts down to zero. More particularly, in the embodiment of FIG. 7, the actual count is one more than the count field so that the count field is decremented by one before loading into the execution register 134. The counters use the count field 120B in the execution register 134 as the reload value when zero count is reached while the phase selection multiplexer 124 simply closes a phase selection switch 136, 138, 140, or 142 based on a value in the phase field 130 of the execution register 134. Continuing the above example (see FIG. 8), PeriodRegister = 4, 2, 1

Accumulator = +X, 0, 0   Phase & UnderRange of Accumulator

Acc1 = 4, 2, 1   Next Accumulator value

Figure 8:
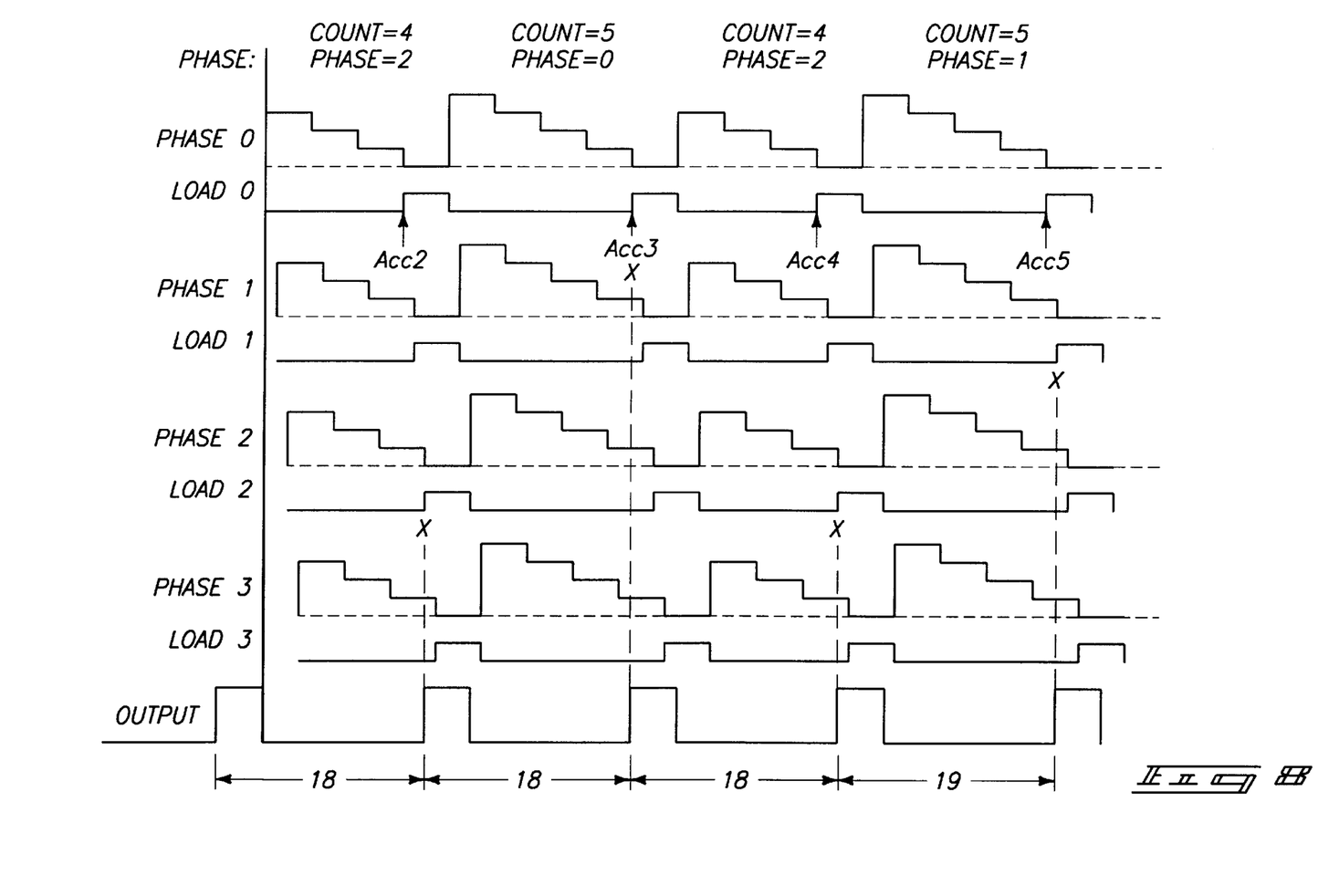
FIG. 8 is a timing diagram illustrating operation of the DCO of FIG. 7.

Therefore, four clocks will be counted, and phase 2 will be selected the output pulse using switch 140. When this pulse is output, the next pulse execution values are calculated as:

|                  |          |
|------------------|----------|
| PeriodRegister = | 4, 2, 1  |
| Accumulator =    | +X, 2, 1 |
| Acc2 =           | 5, 0, 2  |

Therefore, five clocks are counted and phase 0 is selected for the output pulse. This pulse is 4×40 ns+2×10 ns=180 ns after the first pulse.

Continuing,

|                  |          |                                  |
|------------------|----------|----------------------------------|
| PeriodRegister = | 4, 2, 1  |                                  |
| Acc =            | +X, 0, 2 | Phase & UnderRange of Accumulator |
| Acc3 =           | 4, 2, 3  |                                  |

This pulse will also be 180 ns from the previous pulse. Next,

|                  |          |                                  |
|------------------|----------|----------------------------------|
| PeriodRegister = | 4, 2, 1  |                                  |
| Acc =            | +X, 2, 3 | Phase & UnderRange of Accumulator |
| Acc4 =           | 5, 1, 0  |                                  |

Due to the carry over of the UnderRange field, this pulse will be 190 ns from the previous pulse. The total time for these last four pulses is 180*3+190=730 ns for an average period of 730 ns/4=182.5 ns As long as an average of four pulses periods can be accumulated, a resolution of 2.5 ns can be achieved even though the shift between each phase is 10 ns.

The output pulse period is dithered or shifted by one phase every so many pulses to achieve a higher resolution when several pulse periods are averaged. The longest length of this averaging is the UnderRange count which was four in the above example.

PLLs 164 and 166 using the tracking clock implement this averaging of several pulse periods and the length of the averaging is set by the input divider and the loop bandwidth of the PLLs. Since the tracking clock can be supplied indefinitely even with no servo code, the problem of PLL drift is still avoided.

The method described in the example above can be adjusted for any number of bits in each of the fields 120, 130, and 128 to allow a wide range of output frequencies (periods) and period resolutions.

Adding more bits to the counters 112, 114, 116, and 118 and the count field 120 allows generation of very low frequencies. Adding more clock phases and phase field 130 bits allows either higher non-averaged or instantaneous resolution for the same fundamental DCO clock frequency or use of a lower DCO clock frequency for the same instantaneous resolution.

Adding more UnderRange bits allows higher average resolution but lengthens the number of pulses which must be averaged to achieve this higher resolution.

Figure 9:
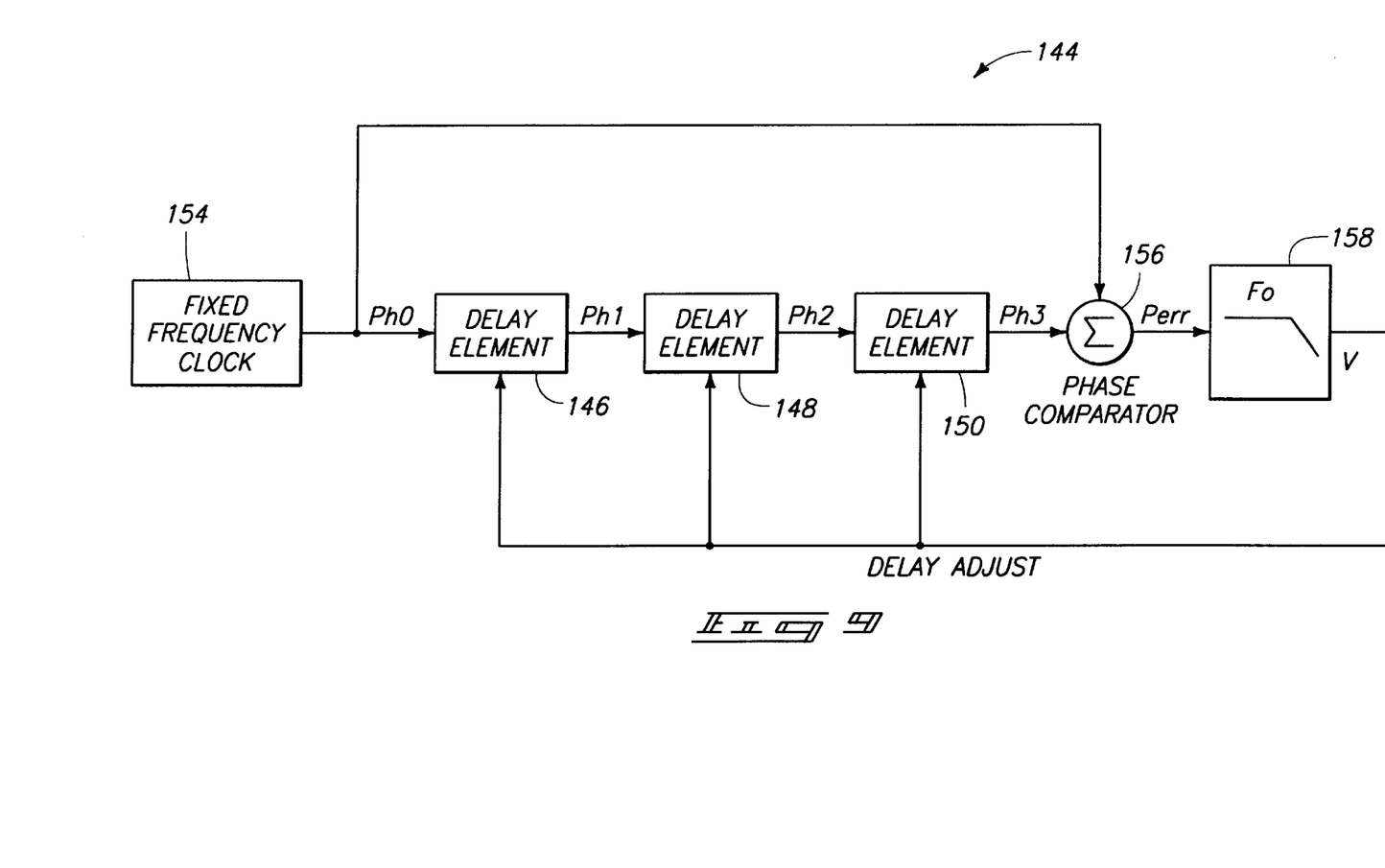
FIG. 9 illustrates a multiple phase clock generator used with the DCO of FIG. 8.
Figure 11:
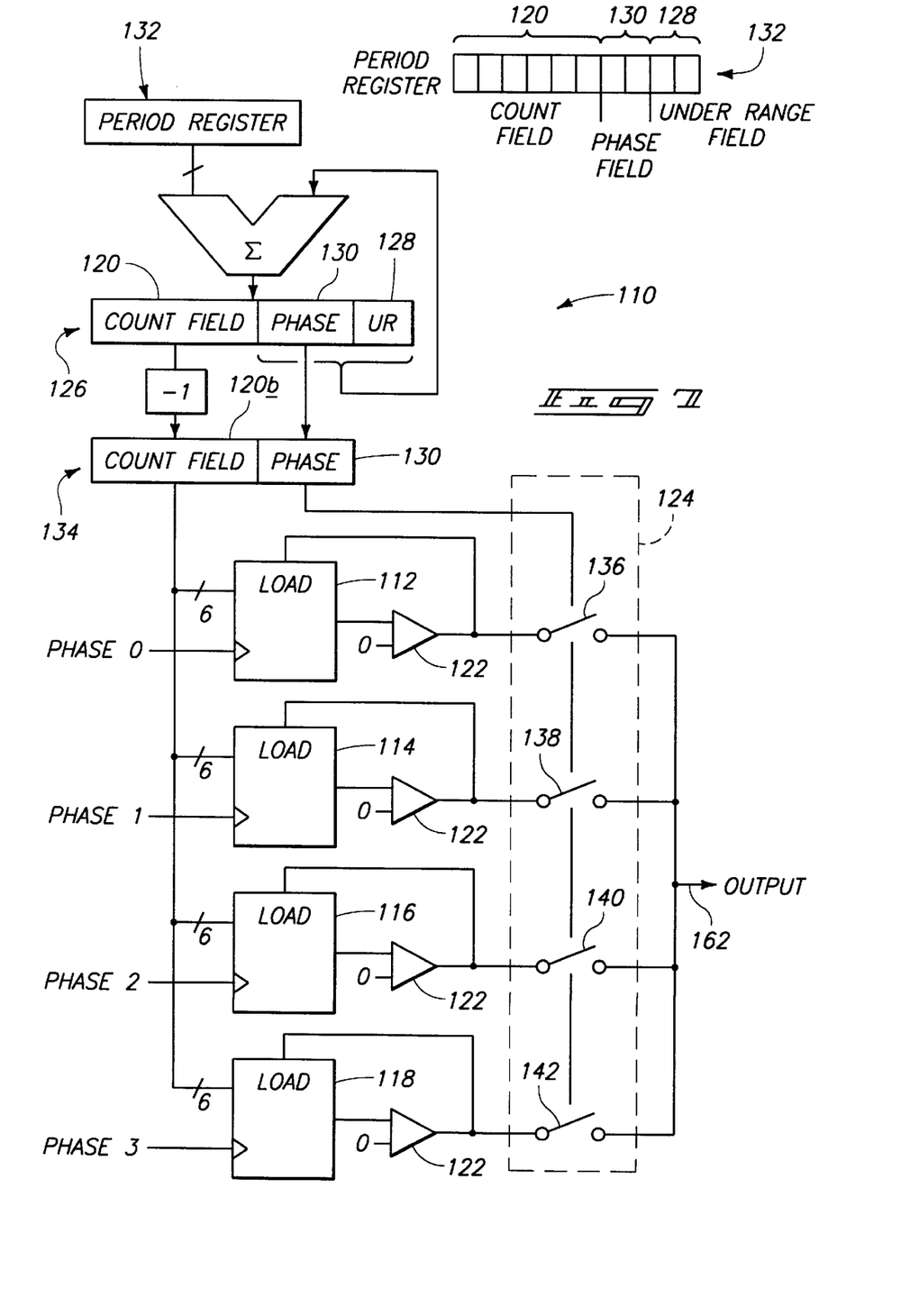

A multiple phase clock generator 144 used to generate the PHASE 0, PHASE 1, PHASE 2, and PHASE 3 clock signals used by the counters 112, 114, 116, and 118 is shown in FIG. 9. The multiple phase clock generator 144 comprises, in one embodiment, a plurality of delay elements 146, 148, 150, and 152 coupled together in cascade, and an input clock 154 coupled to the first delay element 146. The delay elements 146, 148, and 150 each have an input and an output. The delay elements define respective phases Ph0, Ph1, Ph2, and Ph3 of the multiple phase clock generator 144. These phases Ph0, Ph1, Ph2, and Ph3 are coupled to the clock inputs PHASE 0, PHASE 1, PHASE 2, and PHASE 3, respectively, of counters 112, 114, 116, and 118 of FIG. 7. Thus, the number of delay elements 88, 90, and 92 depends on the number of phases. In the embodiment shown in FIG. 9, three delay elements are provided defining four phases Ph0, Ph1, Ph2, and Ph3. However, there may be any desired number of phases. For example, in one embodiment, there are eight phases. The last delay element 150 has an output Ph3 that is controlled to have a phase that is the same as the phase of the input clock 154. More particularly, the delay elements 146, 148, and 150 are adjustable delay elements and the tape drives 14 and 16 further include control circuitry configured to adjust the delay elements such that the output Ph3 of the last delay element 150 has the same phase as the input clock 154. In the illustrated embodiment, the delay elements 146, 148, and 150 are all controlled simultaneously as opposed to being individually controllable. The delay elements 146, 148, and 150 are therefore preferably constructed in a localized and controlled manner, so that the delay variation between delay elements is limited. Otherwise, non-uniformity of the phases with respect to each other phase may lead to error in the captured time value of the event.

The control circuitry includes a phase comparator 156 which compares the phase of the output Ph3 of the last delay element 150 with the input clock 154 and provides an output Perr indicative of any difference in phase. The control circuitry further comprises a low pass filter 158. The phase error between the input clock 154 and the output Ph3 of the last delay element 150 is filtered and used to adjust the delay of all of the delay elements 146, 148, and 150. This way, the total delay of all of the delay elements is assured to be one cycle of the input clock over part to part, temperature, supply voltage and any other variations. In one embodiment, the multiple phase clock generator 144 is the same clock that is used to define the clock 87 of FIG. 6.

The protection sought is not to be limited to the disclosed embodiments, which are given by way of example only, but instead is to be limited only by the scope of the appended claims.

What is claimed is:

1. An adaptive media speed drive unit for use with a magnetic storage medium, the magnetic storage medium having a timing based servo pattern written thereon in a servo band, the servo pattern including transitions, the drive unit including:

a magnetic head including a servo read element configured to read the servo pattern and produce a signal, the signal including recognizable signal events corresponding to the servo read element reading servo transitions, the magnetic head further including a data write element;

a servo decoder including time capture logic configured to determine the amount of time between the signal events; and a digitally controlled oscillator configured to produce a tracking clock which the write element can use to write data to the storage medium with a uniform spacing regardless of storage medium speed, the digitally controlled oscillator including a multiple phase clock generator whereby resolution is enhanced.

2. An adaptive media speed drive unit in accordance with claim 1 wherein the time capture logic includes a multiple phase clock generator.

3. An adaptive media speed drive unit in accordance with claim 2 wherein the time capture logic comprises a plurality of multiple-bit binary counters configured to count freely, and a plurality of multiple-bit latches respectively coupled to the binary counters, wherein the latches latch count values for the respective phases in response to the recognizable signal events corresponding to the servo read element reading servo transitions.

4. An adaptive media speed drive unit in accordance with claim 1 wherein the digitally controlled oscillator includes circuitry defining a plurality of clock phases, and a plurality of counters, the counters being respectively coupled to the clock phases.

5. An adaptive media speed drive unit in accordance with claim 4 wherein digitally controlled oscillator includes a period register coupled to the time capture logic to receive a count value representative of speed of the media relative to the head from the time capture logic, the period register being coupled to the counters to supply the count value as reload values to the respective counters.

6. An adaptive media speed drive unit in accordance with claim 5 wherein the digitally controlled oscillator further includes an accumulator coupled to the period register, the accumulator including a field which selects which of the phases is to be used to define the tracking clock.

7. An adaptive media speed drive unit in accordance with claim 6 and further comprising a multiplexor coupled to the period register and configured to select the phase indicated by the phase value to define the tracking clock.

8. An adaptive media speed drive unit in accordance with claim 6 wherein the period register is further configured to receive an underrange value from the time capture logic and wherein the tracking clock has an output pulse period which is shifted by one phase every predetermined number of pulses, in response to the underrange value, whereby a higher resolution is achieved than by using only multiple phases.

9. An adaptive media speed drive unit in accordance with claim 4 wherein the circuitry defining a plurality of phases of a clock comprises a plurality of delay elements coupled together in cascade and respectively having an input and an output, and an input clock coupled to the input of the first of the cascaded delay elements, and wherein the last of the cascaded delay elements has an output with a phase that is the same as the phase of the input clock.

10. An adaptive speed tape drive for use with a magnetic tape having a length and a width and a servo pattern written thereon, the servo pattern including transitions, the tape drive comprising:
   a tape head including a data write element and a servo read element configured to read the servo pattern and produce a signal, the signal including recognizable signal events corresponding to the servo read element reading servo transitions;
   a motor configured to move the length of the tape relative to the head so that the servo read element can read the servo pattern;
   a servo decoder configured to receive the servo signal, the servo decoder including time capture logic configured to determine the amount of time between the signal events; and
   a digitally controlled oscillator configured to produce a tracking clock which the write element can use to write data to the tape with a uniform spacing regardless of tape speed, the digitally controlled oscillator including a multiple phase clock generator.

11. An adaptive speed tape drive in accordance with claim 10 wherein the time capture logic includes a multiple phase clock.

12. An adaptive speed tape drive in accordance with claim 11 wherein the time capture logic comprises a plurality of multiple-bit binary counters configured to count freely, and a plurality of multiple-bit latches respectively coupled to the binary counters, wherein the latches latch count values for the respective phases in response to the recognizable signal events corresponding to the servo read element reading servo transitions.

13. An adaptive speed tape drive in accordance with claim 10 wherein the digitally controlled oscillator includes circuitry defining a plurality of clock phases, and a plurality of counters, the counters being respectively coupled to the clock phases.

14. An adaptive speed tape drive in accordance with claim 13 wherein the digitally controlled oscillator includes a period register coupled to the time capture logic to receive a count value representative of speed of the tape relative to the head from the time capture logic, the period register being coupled to the counters to supply the count value as reload values to the respective counters.

15. An adaptive speed tape drive in accordance with claim 14 wherein the digitally controlled oscillator further includes an accumulator coupled to the period register, the accumulator including a field which selects which of the phases is to be used to define the tracking clock.

16. An adaptive speed tape drive in accordance with claim 15 and further comprising a multiplexor coupled to the period register and configured to select the phase indicated by the phase value to define the tracking clock.

17. An adaptive speed tape drive in accordance with claim 15 wherein the period register is further configured to receive an underrange value from the time capture logic and wherein the tracking clock has an output pulse period which is shifted by one phase every predetermined number of pulses, in response to the underrange value, whereby a higher resolution is achieved than by using only multiple phases.

18. A method for producing a tracking clock signal used for writing data in an equally spaced manner to a magnetic storage medium in an adaptive speed drive unit, the magnetic medium having a servo pattern written thereon in a servo band, the servo pattern including transitions, the magnetic medium being movable relative to a magnetic head and the head including a servo read element configured to read the servo pattern and produce a signal, the signal including recognizable signal events corresponding to the servo read element reading servo transitions, the method comprising:
   receiving the servo signal, and determining the speed of the magnetic medium, with respect to the head, by determining the amount of time between the signal events; and
   producing the tracking clock by loading a reload value representative of the speed of the magnetic medium in counters of a digitally controlled oscillator having a multiple phase clock generator.

19. A method in accordance with claim 18 and further comprising selecting a counter of the digitally controlled oscillator in response to the speed of the magnetic medium.

20. A method in accordance with claim 18 wherein using a multiple phase clock generator comprises using cascaded delay elements, respective delay elements defining respective phases coupled to the counters.

* * * * *